(12) United States Patent
Liu et al.

(10) Patent No.: US 12,515,515 B2
(45) Date of Patent: Jan. 6, 2026

(54) POWERTRAIN, METHOD FOR CONTROLLING COOLING OF POWERTRAIN, AND VEHICLE

(71) Applicant: Huawei Digital Power Technologies Co., Ltd., Shenzhen (CN)

(72) Inventors: Hongbing Liu, Shanghai (CN); Jingzhou Wei, Shanghai (CN); Yi Cao, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 18/167,466

(22) Filed: Feb. 10, 2023

(65) Prior Publication Data

US 2023/0256811 A1 Aug. 17, 2023

(30) Foreign Application Priority Data

Feb. 11, 2022 (CN) .......................... 202210130262.4

(51) Int. Cl.
*F16H 57/04* (2010.01)
*B60K 1/02* (2006.01)
(Continued)

(52) U.S. Cl.
CPC ................ *B60K 11/02* (2013.01); *B60K 1/02* (2013.01); *F16H 57/0413* (2013.01); *F16H 57/0417* (2013.01); *B60K 2001/006* (2013.01)

(58) Field of Classification Search
CPC ............. F16H 57/0413; F16H 57/0415; F16H 57/0417; F16H 57/0467; F16H 57/0476; F16H 57/04; F16H 57/042; F16H 57/0421; F16H 57/0426; F16H 2057/02034; H02K 1/20; H02K 1/32; H02K 3/24; H02K 5/20; H02K 5/203; H02K 7/116; H02K 7/10;
(Continued)

(56) References Cited

U.S. PATENT DOCUMENTS 4,284,913 A * 8/1981 Barnhardt ................ H02K 9/19
310/83
5,217,085 A * 6/1993 Barrie ...................... F01M 1/16
184/6.12
(Continued)

FOREIGN PATENT DOCUMENTS

CN 109474127 A 3/2019
CN 112106281 A 12/2020
(Continued)

*Primary Examiner* — Edgardo San Martin
(74) *Attorney, Agent, or Firm* — Conley Rose, P.C.

(57) ABSTRACT

A powertrain includes a reservoir configured to store coolant; a first drive motor, where the first drive motor includes a first stator and a first rotor; a second drive motor, where the second drive motor includes a second stator and a second rotor; a first pump and a second pump, where an inlet of the first pump is coupled to the reservoir, and an inlet of the second pump is coupled to the reservoir; a heat exchanger, where the heat exchanger is coupled to the first pump; a first flow path, where the first flow path is coupled to an outlet of the first pump, and the first flow path is used to supply the coolant to the first stator and the second stator through the heat exchanger.

15 Claims, 3 Drawing Sheets

(51) Int. Cl.
  *B60K 11/02* (2006.01)
  *H02K 9/19* (2006.01)
  *H02K 9/26* (2006.01)
  *H02K 11/25* (2016.01)
  *B60K 1/00* (2006.01)

(58) Field of Classification Search
  CPC ........... H02K 9/00; H02K 9/19; H02K 9/193;
         H02K 9/197; H02K 9/26; H02K 11/25;
         B60K 1/02; B60K 11/02; B60K 2001/006
  See application file for complete search history.

(56) References Cited

U.S. PATENT DOCUMENTS

| | | | | |
|---|---|---|---|---|
| 5,372,213 | A * | 12/1994 | Hasebe | B60K 1/02 184/6.12 |
| 8,450,888 | B2 * | 5/2013 | Shafer | H02K 5/203 310/60 A |
| 10,272,767 | B1 * | 4/2019 | Tang | F01P 5/10 |
| 10,622,869 | B2 * | 4/2020 | Kiyokami | B60K 6/40 |
| 10,862,365 | B2 * | 12/2020 | Yamaguchi | H02K 5/203 |
| 11,005,318 | B2 * | 5/2021 | Nakane | H02K 7/006 |
| 11,054,018 | B2 * | 7/2021 | Hori | F16H 57/0434 |
| 11,231,103 | B2 * | 1/2022 | Staake | F16H 57/0441 |
| 11,434,977 | B2 * | 9/2022 | Takahashi | F16H 57/04 |
| 11,502,579 | B2 * | 11/2022 | Nakamatsu | B60K 1/00 |
| 11,588,379 | B2 * | 2/2023 | Steinz | B60K 1/00 |
| 11,623,508 | B2 * | 4/2023 | Oechslen | H05K 7/20927 310/54 |
| 11,873,897 | B2 * | 1/2024 | Nakamatsu | F16H 57/0457 |
| 11,906,037 | B2 * | 2/2024 | Liu | F16H 57/0435 |
| 12,057,763 | B2 * | 8/2024 | Yang | B60K 7/0007 |
| 12,062,972 | B2 * | 8/2024 | Franck | H02K 9/197 |
| 2023/0287975 | A1 * | 9/2023 | Xie | F16H 57/0476 |
| 2024/0271692 | A1 * | 8/2024 | Gassmann | F16H 57/0436 |
| 2024/0271693 | A1 * | 8/2024 | Gassmann | F16H 57/045 |
| 2024/0271694 | A1 * | 8/2024 | Gassmann | F16H 57/0413 |
| 2024/0348128 | A1 * | 10/2024 | Krank | H02K 9/19 |
| 2024/0401693 | A1 * | 12/2024 | Li | F16H 57/0436 |

FOREIGN PATENT DOCUMENTS

| | | | | |
|---|---|---|---|---|
| CN | 115398783 | A * | 11/2022 | |
| CN | 117345848 | A * | 1/2024 | |
| CN | 117515139 | A * | 2/2024 | |
| DE | 102019215048 | A1 * | 4/2021 | |
| DE | 102022202272 | A1 * | 9/2022 | ......... B60K 1/00 |
| DE | 102022209374 | A1 * | 3/2023 | ......... B60K 1/00 |
| DE | 102022209689 | A1 * | 3/2023 | ......... B60K 1/00 |
| EP | 0362757 | A2 * | 4/1990 | |
| JP | 2006312353 | A * | 11/2006 | ......... F16H 57/0434 |
| JP | 2018193002 | A * | 12/2018 | ......... B60K 1/02 |
| WO | WO-2024216973 | A1 * | 10/2024 | ......... B60K 1/02 |

* cited by examiner

POWERTRAIN, METHOD FOR CONTROLLING COOLING OF POWERTRAIN, AND VEHICLE

CROSS-REFERENCE TO RELATED APPLICATIONS

This claims priority to Chinese Patent Application No. 202210130262.4 filed on Feb. 11, 2022, which is hereby incorporated by reference in its entirety.

TECHNICAL FIELD

This disclosure generally relates to the field of vehicles, and in particular, this disclosure relates to a powertrain, a method for controlling cooling of a powertrain, and a vehicle.

BACKGROUND

With constant pursuit of people for vehicle performance, a powertrain of a vehicle needs to output a higher rotational speed and a larger torque. This causes more heat to be generated in the powertrain. As a result, efficiency of the powertrain is reduced, and adverse impact is imposed on performance of the powertrain. This imposes a higher requirement for cooling efficiency of the powertrain. A dual-drive vehicle model is used as an example. A dual-drive powertrain includes dual motors and dual gearboxes. Because a quantity of components is doubled, a requirement for cooling oil is doubled. In addition, arrangement of a cooling oil path is also more complex, making processing and manufacturing difficult.

SUMMARY

Embodiments of this disclosure provide a powertrain, a method for controlling cooling of the powertrain, and a corresponding vehicle, to at least partially resolve the foregoing and/or other potential problems in a conventional technology.

According to a first aspect of this disclosure, a powertrain is provided. The powertrain includes a reservoir configured to store coolant, a first drive motor, where the first drive motor includes a first stator and a first rotor, a second drive motor, where the second drive motor includes a second stator and a second rotor, a first pump and a second pump, where an inlet of the first pump is connected to the reservoir, and an inlet of the second pump is connected to the reservoir, a heat exchanger, where the heat exchanger is connected to the first pump, a first flow path, where the first flow path is connected to an outlet of the first pump, and the first flow path is used to supply the coolant to the first stator and the second stator through the heat exchanger, and a second flow path, where the second flow path is connected to an outlet of the second pump, and the second flow path is used to supply the coolant to the first rotor and the second rotor.

With this embodiment of this disclosure, the coolant used to cool the rotors and the stators of the powertrain is separately transmitted, and the coolant for cooling the stators passes through the heat exchanger, so that cooling effect can be properly optimized.

In an implementation, the powertrain further includes a first gearbox, where the first gearbox is connected to the first rotor, a second gearbox, where the second gearbox is connected to the second rotor, and a third flow path, where the third flow path is connected to the second flow path, and is used to supply the coolant to the first gearbox and the second gearbox. With this arrangement, cooling and lubrication effect for the stators, the rotors, and the gearboxes on both sides can be incorporated in a system, so that lubricant is evenly distributed to the motors and the gearboxes on both sides.

In an implementation, the powertrain further includes a rotor bearing configured to support the first rotor and the second rotor, and a fourth flow path, where the fourth flow path is connected to at least one of the first flow path and the second flow path, and is used to supply the coolant to the rotor bearing. With this arrangement, cooling of the rotor bearing can be flexibly controlled according to different design requirements.

In an implementation, the powertrain further includes a first filter, where the first filter is disposed between the reservoir and the first pump, and is configured to filter the coolant before the coolant is drawn off by the first pump. With this arrangement, potential damage of impurities in the coolant to the stators of the powertrain can be avoided.

In an implementation, the powertrain further includes a second filter, where the second filter is disposed between the reservoir and the second pump, and is configured to filter the coolant before the coolant is drawn off by the second pump. With this arrangement, potential damage of impurities in the coolant to the rotors and the gearboxes of the powertrain can be avoided.

According to a second aspect of this disclosure, a method for controlling cooling of the powertrain according to the first aspect of this disclosure is provided. The method includes determining a temperature of the powertrain, determining a rotational speed of the first pump and a rotational speed the second pump, and adjusting the rotational speed of the first pump and/or the rotational speed of the second pump based on the temperature of the powertrain. With this arrangement, cooling and lubrication effect for the powertrain can be dynamically adjusted.

In an implementation, adjusting the rotational speed of the first pump and/or the rotational speed of the second pump based on the temperature of the powertrain includes increasing the rotational speed of the first pump and/or the rotational speed of the second pump in response to that the temperature of the powertrain is higher than a target temperature. With this arrangement, when a cooling amount needs to be increased, the rotational speed of the pump is adjusted in a timely manner, so that the temperature of the powertrain can be effectively reduced.

In an implementation, increasing the rotational speed of the first pump and/or the rotational speed of the second pump includes increasing both the rotational speed of the first pump and the rotational speed of the second pump in response to that the rotational speed of the first pump is consistent with the rotational speed of the second pump. With this arrangement, adverse impact caused by overheat to the powertrain can be reduced.

In an implementation, increasing the rotational speed of the first pump and/or the rotational speed of the second pump includes, in response to that the rotational speed of the first pump is inconsistent with the rotational speed of the second pump, increasing a rotational speed of a pump, of the first pump and the second pump, that has a lower rotational speed. With this arrangement, the rotational speed of the first pump and the rotational speed of the second pump can be properly adjusted and controlled.

In an implementation, adjusting the rotational speed of the first pump and/or the rotational speed of the second pump based on the temperature of the powertrain includes reducing the rotational speed of the first pump in response to that the temperature of the powertrain is lower than a target temperature. With this arrangement, a power of the first pump can be saved.

In an implementation, determining a rotational speed of the first pump includes determining the rotational speed of the first pump based on an amount of heat generated by the powertrain and a temperature of coolant in the heat exchanger. With this arrangement, factors of the powertrain and the heat exchanger are considered, so that the rotational speed of the first pump is more properly adjusted.

In an implementation, determining a rotational speed of the second pump includes determining the rotational speed of the second pump based on a rotational speed and a torque of the powertrain. With this arrangement, an operating condition of the powertrain is considered, so that the rotational speed of the second pump is more properly adjusted.

According to a third aspect of this disclosure, a vehicle is provided. The vehicle includes a drive wheel and the powertrain according to the first aspect of this disclosure, where the powertrain is connected to the drive wheel in a transmission manner.

The foregoing and other aspects of this disclosure are clearer and easier to understand in descriptions of the following plurality of embodiments.

BRIEF DESCRIPTION OF DRAWINGS

In conjunction with accompanying drawings and with reference to the following detailed descriptions, the foregoing and other features, advantages, and aspects of embodiments of this disclosure become more apparent. In accompanying drawings, same or similar reference numerals indicate same or similar elements. Accompanying drawings are not necessarily drawn to scale.

DESCRIPTION OF EMBODIMENTS

The following describes embodiments of this disclosure in more detail with reference to accompanying drawings. Although some embodiments of this disclosure are shown in accompanying drawings, it should be understood that this disclosure may be implemented in various forms and should not be construed as being limited to embodiments described herein. Instead, these embodiments are provided for a more thorough and complete understanding of this disclosure. It should be understood that accompanying drawings and embodiments of this disclosure are merely used as examples, but not intended to limit the protection scope of this disclosure.

In descriptions of embodiments of this disclosure, the term "include" and similar terms thereof should be understood as open-ended inclusion, that is, "including but not limited to". The term "based on" should be understood as "at least partially based on". The term "an embodiment" or "the embodiment" should be understood as "at least one embodiment". The terms "first", "second", and the like may indicate different or same objects. Other explicit and implicit definitions may be further included in the following descriptions.

As described above, a powertrain including a motor needs to be cooled, to avoid efficiency reduction or even failures of the powertrain due to overheat. In a conventional solution, a pump draws coolant from a reservoir that stores the coolant, to cool a stator and a rotor in a powertrain. After cooling is completed, the coolant is transmitted back to the reservoir. Then a temperature of the coolant decreases through heat exchange of a heat exchanger, and the coolant cools the stator and the rotor again under a pumping function of the pump, thereby implementing circular cooling. However, an order of magnitude of an amount of heat generated by the stator of the powertrain is usually kilowatts, and an order of magnitude of an amount of heat generated by the rotor is usually hectowatts. In this solution, only a single pump and a single heat exchanger are designed, and cooling paths for the stator and the rotor are not distinguished. Therefore, cooling effect is quite limited.

In another conventional solution, two pumps and two heat exchangers are disposed, and coolant used to cool a stator and a rotor respectively passes through corresponding pumps and heat exchangers. In this solution, completely separate cooling paths are used. As a result, a cooling system includes a complex pipeline structure. This leads to an increased size and a redundant structure of the cooling system, and is also quite inconvenient for maintenance by a person when a failure occurs.

Figure 1:
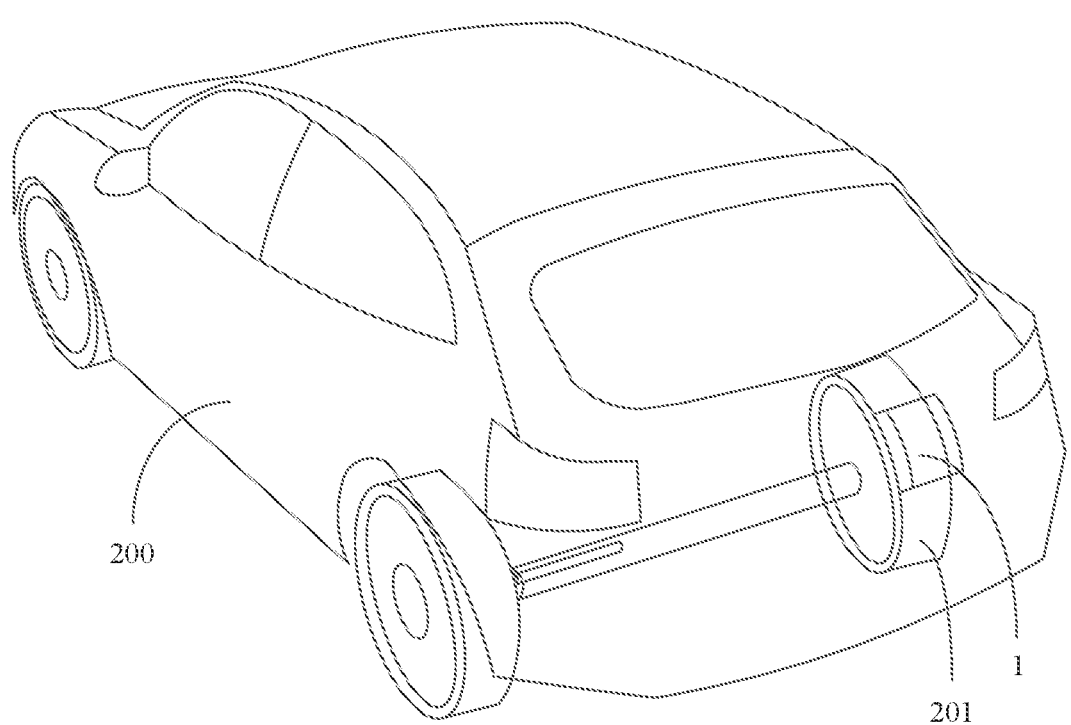
FIG. 1 is a schematic diagram of a structure of a vehicle according to an embodiment of this disclosure.
Figure 2:
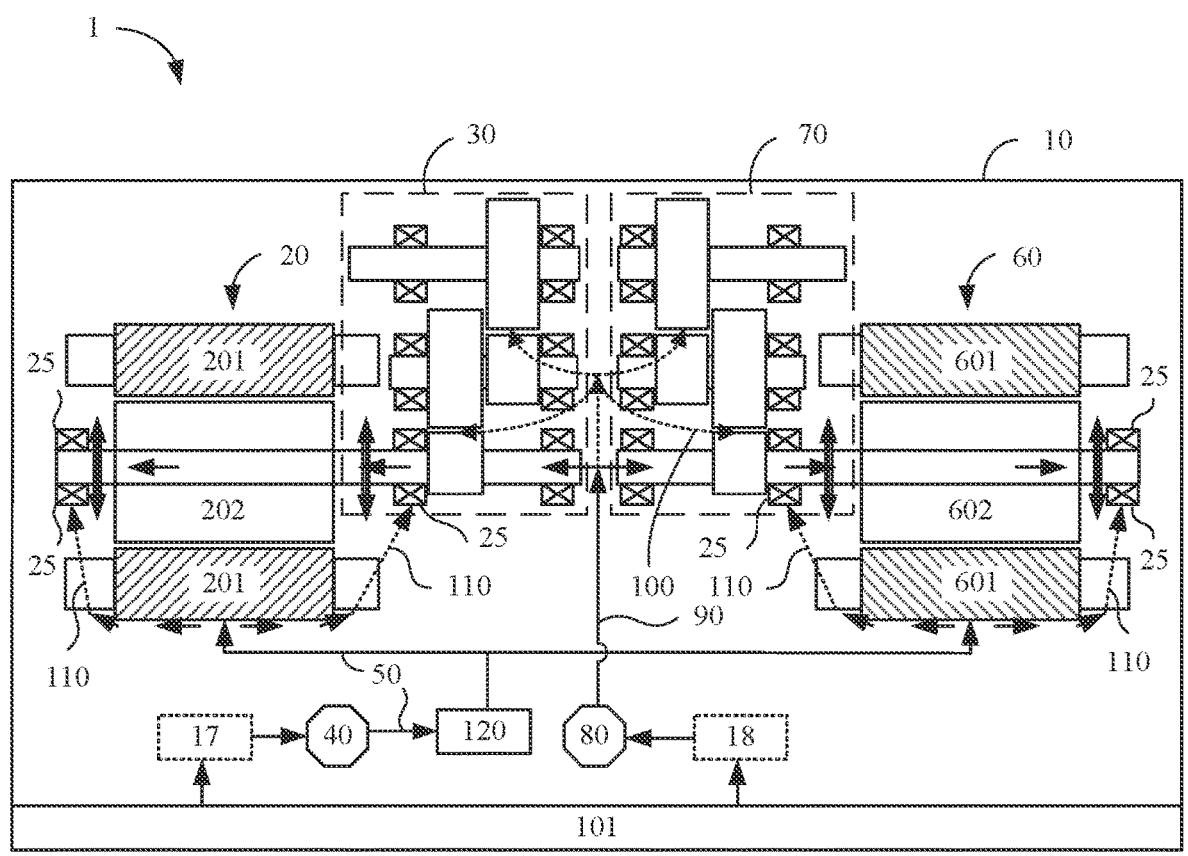
FIG. 2 is a schematic diagram of a structure of a powertrain in FIG. 1.
Figure 3:
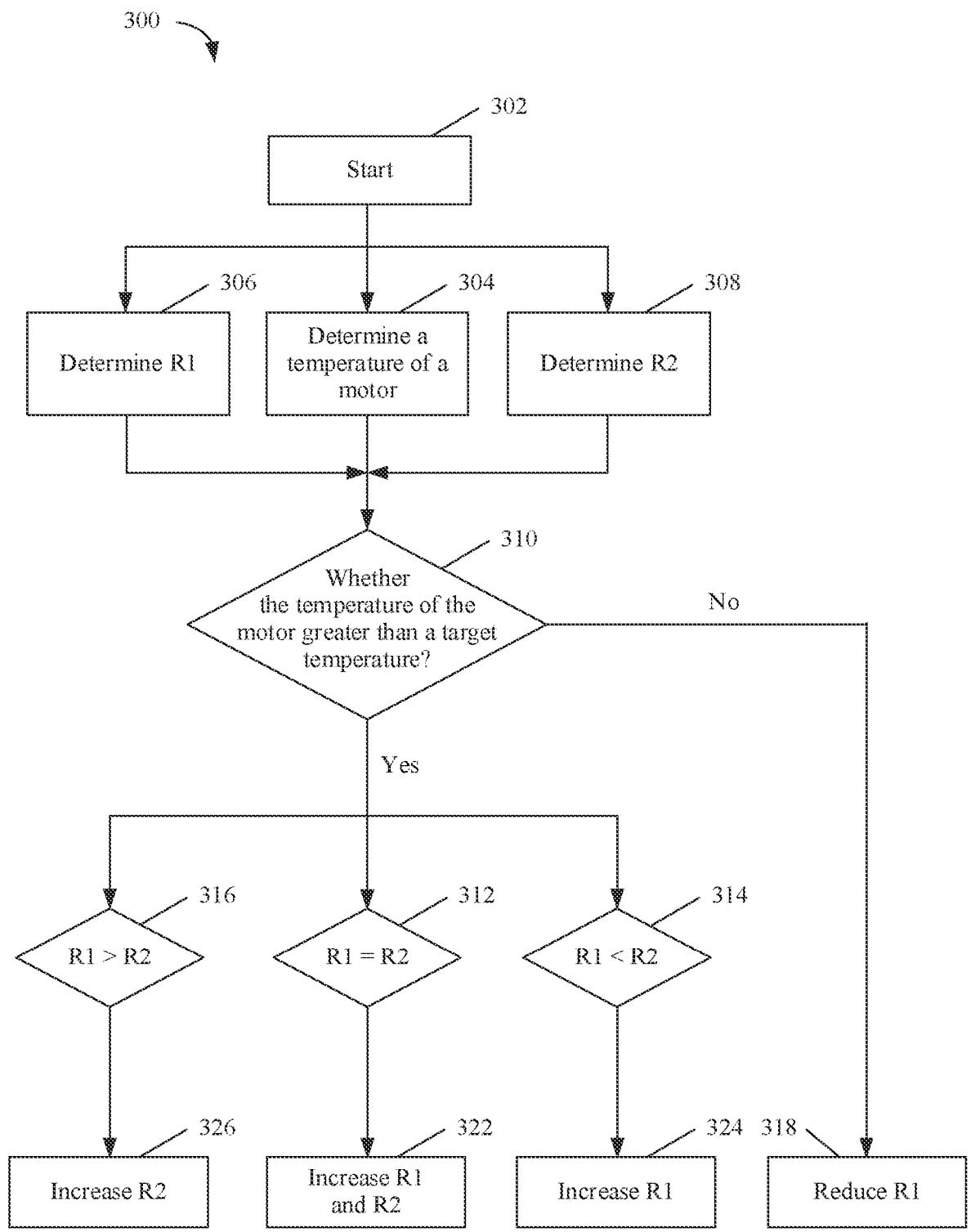
FIG. 3 shows a method for controlling cooling of a powertrain according to an embodiment of this disclosure.

The following describes embodiments of this disclosure with reference to FIG. 1 to FIG. 3. First, FIG. 1 is a schematic diagram of a structure of a vehicle 200 according to an embodiment of this disclosure. As shown in the figure, the vehicle 200 includes a drive wheel 201 and a powertrain 1. The powertrain 1 may be connected to the drive wheel 201 in a transmission manner, and is configured to provide driving force for the vehicle 200, so that the vehicle 200 can operate normally.

Then FIG. 2 shows the powertrain 1 of the vehicle 200 according to an embodiment of this disclosure. As shown in FIG. 2, the powertrain 1 in this embodiment may include a reservoir 101 configured to store coolant (for example, cooling oil). In some embodiments, the reservoir 101 may be an oil pan on the vehicle 200. The powertrain 1 includes a first drive motor 20, a first gearbox 30, a first flow path 50, a second drive motor 60, a second gearbox 70, a second flow path 90, and a third flow path 100. The powertrain further includes a first pump 40 and a second pump 80. The first drive motor 20 may include a first stator 201 and a first rotor 202. The first rotor 202 is rotatably assembled in the first stator 201. The first gearbox 30 is connected to the first rotor 202 in a transmission manner. The second drive motor 60 may include a second stator 601 and a second rotor 602. The second rotor 602 is rotatably assembled in the second stator 601. The second gearbox 70 is connected to the second rotor 602 in a transmission manner.

As shown in FIG. 2, an inlet of the first pump 40 is connected to the reservoir 101, an outlet of the first pump 40 is connected to the first flow path 50, and the first pump 40 may be configured to pump the coolant in the reservoir 101 into the first flow path 50, and supply the coolant to the first stator 201 and the second stator 601 through the first flow path 50. A heat exchanger 120 is disposed in the first flow path 50, and the heat exchanger 120 is connected to the first pump 40. The heat exchanger 120 accommodates a cooling medium (for example, cooling water or cooling oil), used to cool the coolant flowing through the heat exchanger 120. In this way, the coolant cooled by the heat exchanger 120 is transmitted to the first stator 201 and the second stator 601 of the powertrain 1, to effectively cool the first stator 201 and the second stator 601.

It should be understood that the "being connected to" in this disclosure not only includes direct connection without an intermediate component, but also includes indirect connection by using an intermediate component. This is not limited in this embodiment of this disclosure. In addition, it should be noted that the first pump 40 and the second pump 80 may be mechanical pumps or electronic pumps. This is not limited in this disclosure.

Still refer to FIG. 2. An inlet of the second pump 80 is connected to the reservoir 101, an outlet of the second pump 80 is connected to the second flow path 90, and the second pump 80 may be configured to pump the coolant in the reservoir 101 into the second flow path 90, and supply the coolant to the first rotor 202 and the second rotor 602 through the second flow path 90. As shown in FIG. 2, the coolant drawn off by the second pump 80 does not flow through the heat exchanger 120, but is directly transmitted to the first rotor 202 and the second rotor 602 of the powertrain 1, to cool the first rotor 202 and the second rotor 602.

As described above, during operating of the powertrain 1, orders of magnitude of amounts of heat generated by the rotors and the stators are different. With this embodiment of this disclosure, a cooling process for cooling the first rotor 202 and the second rotor 602 may be decoupled from a cooling process for cooling the first stator 201 and the second stator 601, so that cooling effect can be optimized. On the one hand, the coolant for cooling the first stator 201 and the second stator 601 passes through the heat exchanger 120 before performing cooling, so that cooling effect for the first stator 201 and the second stator 601 that generate a large amount of heat can be effectively improved. On the other hand, because an amount of heat generated by the first rotor 202 and the second rotor 602 is smaller than an amount of heat generated by the first stator 201 and the second stator 601, the coolant used to cool and lubricate the first rotor 202 and the second rotor 602 does not need to undergo heat exchange processing by the heat exchanger 120. This can reduce redundancy of the heat exchanger 120, and greatly reduce costs and complexity of the powertrain 1.

As shown in FIG. 2, in some embodiments, the powertrain 1 may further include a third flow path 100. The third flow path 100 may be connected to the second flow path 90, and is used to supply the coolant to the first gearbox 30 and the second gearbox 70. As shown in FIG. 2, the first gearbox 30 and the second gearbox 70 each include a plurality of gear sets meshed with each other. With this arrangement, the gears can be cooled to prevent them from overheating.

It can be understood that the flow paths described above may be implemented by using pipelines. The pipelines may be disposed near corresponding stators, rotors, and gearboxes. For example, holes may be punched in a housing to form the pipelines. If gearbox bearings, in the gearboxes, that perform a supporting function need to be cooled and lubricated, nozzles may be disposed on pipelines near the gearbox bearings, to inject the coolant into the gearbox bearings. As the coolant flows through the gearbox bearings, heat in the gearbox bearings can be taken away by the coolant and therefore cooled. In addition, the gearbox bearings can also be lubricated. In another embodiment, the coolant may also cool and lubricate various transmission gears included in the gearboxes.

In some embodiments, the coolant may be various types of cooling liquid. Alternatively, in another embodiment, another material that is known or that is to be developed in the future may be alternatively used as the coolant, provided that the material can implement a predetermined cooling function. A specific material is not limited in this embodiment of this disclosure.

As shown in FIG. 2, the powertrain 1 further includes a rotor bearing 25 configured to support the first rotor 202 and the second rotor 602. In some embodiments, the powertrain 1 may further include a fourth flow path 110. As shown in FIG. 2, the fourth flow path 110 is connected to the first flow path 50. In this way, the heat exchanger 120 may be further configured to transmit cooled coolant to the rotor bearing 25. In other words, the coolant drawn off by the first pump 40 passes through the heat exchanger 120, and cools all of the rotor bearing 25, the first stator 201, and the second stator 601. With this arrangement, because the coolant for cooling and lubricating the rotor bearing 25 is coolant that has undergone heat exchange by the heat exchanger 120, the rotor bearing 25 can be cooled to a great extent.

In some other embodiments, the fourth flow path 110 may be connected to the second flow path 90. In this manner, the second pump 80 may be configured to transmit the coolant to the rotor bearing 25. Therefore, the rotor bearing 25, together with the first rotor 202 and the second rotor 602, is cooled and lubricated by the coolant drawn off by the second pump 80. With this arrangement, a design of complex pipelines between the rotor bearing 25, and the first stator 201 and the second stator 601 can be avoided, thereby further reducing complexity of the powertrain 1.

In some embodiments, the powertrain 1 may further include a first filter 17. The first filter 17 is disposed between the reservoir 11 and the first pump 40. The first filter 17 may filter the coolant before the coolant is drawn off by the first pump 40. In filtered coolant, solid impurities are removed. This can prevent the impurities from causing damage to the components (for example, the first stator 201 and the second stator 601) of the powertrain 1 in a cooling path.

In some embodiments, the powertrain 1 may further include a second filter 18. The second filter 18 is disposed between the reservoir 11 and the second pump 80. The second filter 18 may filter the coolant before the coolant is drawn off by the second pump 80. In filtered coolant, solid impurities are removed. This can prevent the impurities from causing damage to the components (for example, the first rotor 202 and the second rotor 602) of the powertrain 1 in a cooling path.

In some embodiments, the first filter 17 and the second filter 18 may be separated. In some other embodiments, the first filter 17 and the second filter 18 may be alternatively integrated into a single filter. A specific form of the filters is not limited in this embodiment of this disclosure.

In some embodiments, the coolant directly flows back to the reservoir 11 after cooling the powertrain 1 and lubricating the bearings and the gears of the gearboxes. In some other embodiments, the coolant may flow back to the reservoir 11 through the flow paths. In some embodiments, an additional structure (not shown) may be disposed at the end of a cooling pipeline to optimize effect of coolant transmission. The additional structure may include a spray ring, a nozzle, an oil spray mechanical part with a groove, a conduit, or the like.

In the embodiment shown in FIG. 2, the powertrain 1 may further include a housing 10. The housing 10 may be configured to accommodate the various components mentioned above. This makes an arrangement of the powertrain 1 more compact, and helps flexibly mount the powertrain 1 to various vehicles 200.

It should be understood that the powertrain according to this embodiment of this disclosure is described above by using dual drive motors as an example. However, this is merely an example, and there may be any quantity of drive motors and corresponding rotors and stators in the powertrain 1. This is not limited in this embodiment of this disclosure.

The following describes, with reference to FIG. 3, a method 300 for controlling cooling of the powertrain 1 according to an embodiment of this disclosure. The method 300 starts at a block 302. At a block 304, a temperature T of the powertrain 1 is determined. For example, in some embodiments, the temperature T may be measured by a temperature sensor disposed on the first stator 201 and/or the second stator 601 in the powertrain 1. In another embodiment, the temperature T may be alternatively measured by a temperature sensor disposed at another position on the powertrain 1.

At a block 306, a rotational speed R1 of the first pump 40 is determined. In some embodiments, the rotational speed R1 of the first pump 40 may be measured by a rotational speed sensor disposed on the first pump 40. It can be understood that, if the rotational speed R1 of the first pump 40 is increased, the first pump 40 may draw more coolant from the reservoir 11 of the powertrain 1 to the heat exchanger 120 and transmit the coolant to the first stator 201 and/or the second stator 601 within a unit time, so that the first stator 201 and/or the second stator 601 can be cooled to a greater extent. On the contrary, if the rotational speed R1 of the first pump 40 is reduced, less coolant is drawn off by the first pump 40 and transmitted to the first stator 201 and/or the second stator 601 within a unit time. This reduces a degree of cooling for the first stator 201 and/or the second stator 601.

Still refer to FIG. 3. At a block 308, a rotational speed R2 of the second pump 80 is determined. In some embodiments, the rotational speed R2 of the second pump 80 may be measured by a rotational speed sensor disposed on the second pump 80. It can be understood that, if the rotational speed R2 of the second pump 80 is increased, the second pump 80 may draw more coolant from the reservoir 11 of the powertrain 1 to the first rotor 202 and/or the second rotor 602, and the first gearbox 30 and/or the second gearbox 70 within a unit time, so that the first rotor 202 and/or the second rotor 602, and the first gearbox 30 and/or the second gearbox 70 can be cooled to a greater extent. On the contrary, if the rotational speed R2 of the second pump 80 is reduced, less coolant is drawn off by the first pump 40 and transmitted to the first rotor 202 and/or the second rotor 602, and the first gearbox 30 and/or the second gearbox 70 within a unit time. This reduces a degree of cooling for the first rotor 202 and/or the second rotor 602, and the first gearbox 30 and/or the second gearbox 70.

At a block 310, whether the temperature T of the powertrain 1 is higher than a preset target temperature To is determined. If the temperature T of the powertrain 1 is lower than the preset target temperature To, an actual temperature inside the powertrain 1 is not high, and therefore required coolant can be reduced. In this case, the rotational speed R1 of the first pump 40 may be properly reduced, to reduce power consumption of the first pump 40.

It can be understood that the target temperature To may be determined based on a design objective. For example, in some embodiments, the target temperature To may be 130 degree Celsius (° C.), 150° C., or 170° C. A specific value is not limited in this embodiment of this disclosure.

If it is determined that the temperature T of the powertrain 1 is higher than the preset target temperature To, an actual temperature inside the powertrain 1 is excessively high. In this case, the rotational speed R1 of the first pump 40 and/or the rotational speed R2 of the second pump 80 needs to be increased to improve cooling effect inside the powertrain 1.

Further, if the rotational speed R1 of the first pump 40 is consistent with the rotational speed R2 of the second pump 80 at a block 312, in this case, both the rotational speed R1 of the first pump 40 and the rotational speed R2 of the second pump 80 are increased at a block 322. In this manner, cooling effect for all of the first stator 201 and/or the second stator 601, the first rotor 202 and/or the second rotor 602, and the first gearbox 30 and/or the second gearbox 70 can be improved, thereby avoiding adverse impact caused by overheat of the powertrain 1. It should be understood that the "being consistent" herein does not require that the rotational speed R1 of the first pump 40 be exactly the same as the rotational speed R2 of the second pump 80, but a specific deviation between the two rotational speeds is allowed. The deviation may be determined based on characteristics of different drive motors or according to an actual requirement of a vehicle.

At a block 314, if the rotational speed R2 of the second pump 80 is consistent with the rotational speed R1 of the first pump 40, the rotational speed R2 of the second pump 80 is substantially higher than the rotational speed R1 of the first pump 40. In this case, the rotational speed R1 of the first pump 40 is increased at a block 324. With this arrangement, more coolant is drawn off by the first pump 40 and passes through the heat exchanger 120 to cool the first stator 201 and/or the second stator 601 of the powertrain 1, thereby avoiding overheat of the first stator 201 and/or the second stator 601. It can be understood that, if the temperature T of the powertrain 1 is still higher than the preset target temperature To after the rotational speed R1 of the first pump 40 is increased, the increase of only the rotational speed R1 of the first pump 40 is insufficient. In this case, both the rotational speed R1 of the first pump 40 and the rotational speed R2 of the second pump 80 need to be increased again.

At a block 316, if the rotational speed R1 of the first pump 40 is inconsistent with the rotational speed R2 of the second pump 80, the rotational speed R2 of the second pump 80 is substantially lower than the rotational speed R1 of the first pump 40. In this case, the rotational speed R2 of the second pump 80 is increased at a block 326. With this arrangement, more coolant is used to cool the first rotor 202 and/or the second rotor 602, and the first gearbox 30 and/or the second gearbox 70 of the powertrain 1, to effectively cool these rotating parts. It can be understood that, if the temperature T of the powertrain 1 is still higher than the preset target temperature To after the rotational speed R2 of the second pump 80 is increased, the increase of only the rotational speed R2 of the second pump 80 is insufficient. In this case, both the rotational speed R1 of the first pump 40 and the rotational speed R2 of the second pump 80 need to be increased again.

With the foregoing steps, when cooling effect inside the powertrain 1 needs to be improved, first, the rotational speed of the first pump 40 may be compared with the rotational speed of the second pump 80, and a rotational speed of a pump, of the first pump 40 and the second pump 80, that has a lower rotational speed may be increased first. Then both the rotational speed R1 of the first pump 40 and the rotational speed R2 of the second pump 80 are increased if necessary, thereby implementing proper utilization and dynamic adjustment of the first pump 40 and the second pump 80.

In some embodiments, the rotational speed R1 of the first pump 40 may be determined based on an amount of heat generated by the powertrain 1 and a temperature of coolant in the heat exchanger 120. For example, the temperature of the coolant in the heat exchanger 120 may be a temperature of oil or water in the heat exchanger 120. In some other embodiments, the rotational speed R2 of the second pump 80 may be determined based on a rotational speed and a torque of the powertrain 1. In this way, both an overall operating condition of the powertrain 1 and an operating status of the heat exchanger 120 are considered during cooling, so that the rotational speeds of the pumps can be adjusted more effectively and properly.

In another embodiment, the rotor bearing 25 may be lubricated by coolant drawn off by the first pump 40. In this case, a lubrication amount required for the rotor bearing 25 may be calculated, and a rotational speed required for the first pump 40 may be determined based on a larger one of an amount of coolant required for cooling the first stator 201 and/or the second stator 601 and the lubrication amount required for the rotor bearing 25.

Compared with a conventional cooling solution, according to this embodiment of this disclosure, the components in the powertrain 1 can be effectively cooled only by using one heat exchanger 120. This arrangement has a simple structure and controllable costs. In addition, dynamic adjustment of cooling in the powertrain 1 can ensure that cooling effect of each pump is improved according to an actual requirement. This helps reduce energy consumption of the powertrain 1.

Although this subject matter has been described in languages specific to structural features and/or methodological logical actions, it should be understood that the subject matter defined in the appended claims is not necessarily limited to the specific features or actions described above. On the contrary, the specific features and actions described above are merely example forms for implementing the claims.

What is claimed is:

1. A powertrain comprising:
   a reservoir configured to store coolant;
   a first drive motor comprising:
     a first stator; and
     a first rotor;
   a second drive motor comprising:
     a second stator; and
     a second rotor;
   a first pump comprising:
     a first inlet coupled to the reservoir; and
     a first outlet;
   a second pump comprising:
     a second inlet coupled to the reservoir; and
     a second outlet;
   a heat exchanger coupled to the first pump;
   a rotor bearing configured to support the first rotor and the second rotor;
   a first flow path coupled to the first outlet and configured to supply the coolant to the first stator and the second stator through the heat exchanger;
   a second flow path coupled to the second outlet and configured to supply the coolant to the first rotor and the second rotor; and
   a third flow path connected to the first flow path, wherein the third flow path is configured to supply the coolant to the rotor bearing.

2. The powertrain of claim 1, further comprising:
   a first gearbox coupled to the first rotor;
   a second gearbox coupled to the second rotor; and
   a fourth flow path connected to the second flow path and configured to supply the coolant to the first gearbox and the second gearbox.

3. The powertrain of claim 1, further comprising a filter disposed between the reservoir and the first pump, wherein the filter is configured to filter the coolant before the coolant is drawn off by the first pump.

4. The powertrain of claim 1, further comprising a filter disposed between the reservoir and the second pump, wherein the filter is configured to filter the coolant before the coolant is drawn off by the second pump.

5. A method for controlling cooling of a powertrain, wherein the method comprises:
   storing a coolant in a reservoir of the powertrain;
   determining a first temperature of the powertrain;
   determining a first rotational speed of a first pump of the powertrain and a second rotational speed of a second pump of the powertrain, wherein a first inlet of the first pump is coupled to the reservoir of the powertrain, and wherein a second inlet of the second pump is coupled to the reservoir;
   identifying that the first temperature is higher than a first target temperature;
   identifying that the first rotational speed is inconsistent with the second rotational speed;
   increasing, in response to identifying that the first rotational speed is inconsistent with the second rotational speed, a rotational speed of a pump that has a lower rotational speed between the first pump and the second pump;
   determining, after increasing the rotational speed of the pump that has the lower rotational speed, a second temperature of the powertrain;
   identifying that the second temperature is higher than the first target temperature; and
   increasing, in response to identifying that the second temperature is higher than the first target temperature, the first rotational speed and the second rotational speed.

6. The method of claim 5, wherein increasing the first rotational speed and the second rotational speed comprises:
   identifying that the first rotational speed is consistent with the second rotational speed; and
   increasing, in response to identifying that the first rotational speed is consistent with the second rotational speed, both the first rotational speed and the second rotational speed.

7. The method of claim 5, further comprising:
   determining that a third temperature of the powertrain is lower than a second target temperature; and
   reducing, in response to identifying that the third temperature is lower than the second target temperature, the first rotational speed.

8. A vehicle comprising:
   a powertrain comprising:
     a reservoir configured to store coolant;
     a first drive motor comprising:
       a first stator; and
       a first rotor;
     a second drive motor comprising:
       a second stator; and
       a second rotor;

a first pump comprising:
   a first inlet coupled to the reservoir; and
   a first outlet;
a second pump comprising:
   a second inlet coupled to the reservoir; and
   a second outlet;
a heat exchanger coupled to the first pump;
a rotor bearing configured to support the first rotor and the second rotor;
a first flow path coupled to the first outlet and configured to supply the coolant to the first stator and the second stator through the heat exchanger;
a second flow path coupled to the second outlet and configured to supply the coolant to the first rotor and the second rotor; and
a third flow path connected to the first flow path, wherein the third flow path is configured to supply the coolant to the rotor bearing; and
a drive wheel coupled to the powertrain via a transmission.

9. The vehicle of claim 8, wherein the powertrain further comprises:
a first gearbox coupled to the first rotor;
a second gearbox coupled to the second rotor; and
a fourth flow path connected to the second flow path and configured to supply the coolant to the first gearbox and the second gearbox.

10. The vehicle of claim 9, wherein the powertrain further comprises a filter disposed between the reservoir and the first pump and, wherein the filter is configured to filter the coolant before the coolant is drawn off by the first pump.

11. The vehicle of claim 8, wherein the powertrain further comprises a filter disposed between the reservoir and the second pump, and wherein the filter is configured to filter the coolant before the coolant is drawn off by the second pump.

12. The method of claim 5, wherein determining the first rotational speed comprises determining the first rotational speed based on an amount of heat generated by the powertrain and a third temperature of the coolant in a heat exchanger of the powertrain, and wherein determining the second rotational speed comprises determining the second rotational speed based on a third rotational speed of the powertrain and a torque of the powertrain.

13. The method of claim 6, further comprising
calculating a lubricate amount for a rotor bearing, wherein the rotor bearing is lubricated by coolant from the first pump; and
determining the first rotational speed based on the greater of a coolant amount of coolant for cooling at least one stator of the powertrain and the lubrication amount for the rotator bearing.

14. The powertrain of claim 1, further comprising a filter disposed between the reservoir, the first pump, and the second pump, wherein the filter is configured to filter the coolant before the coolant is drawn off by the first pump and the second pump.

15. The vehicle of claim 8, wherein the powertrain further comprises a filter disposed between the reservoir, the first pump, and the second pump, wherein the filter is configured to filter the coolant before the coolant is drawn off by the first pump and the second pump.

* * * * *